W. GARDNER & G. L. HAYS.
CORN-PLANTER.

No. 169,432.

Patented Nov. 2, 1875.

WITNESSES:
A. W. Almquist
A. F. Terry

INVENTOR:
Wilson Gardner and
BY George L. Hays
Munn & Co
ATTORNEYS.

UNITED STATES PATENT OFFICE

WILSON GARDNER AND GEORGE L. HAYS, OF PIKETON, OHIO.

IMPROVEMENT IN CORN-PLANTERS.

Specification forming part of Letters Patent No. 169,432, dated November 2, 1875; application filed August 21, 1875.

*To all whom it may concern:*

Figure 1:
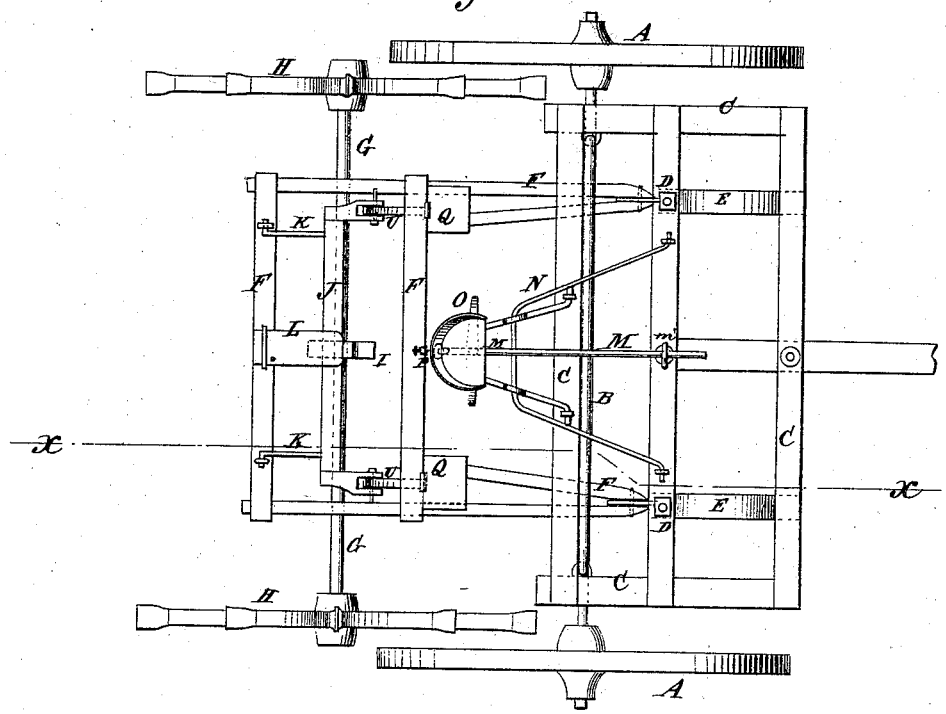
Figure 2:
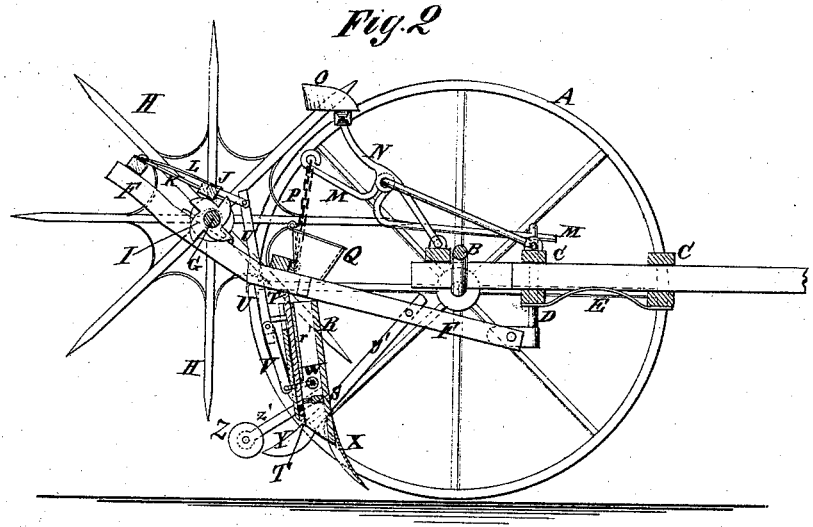
Figure 3:
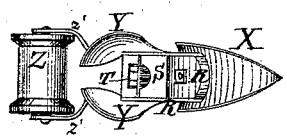

Be it known that we, WILSON GARDNER and GEORGE L. HAYS, of Piketon, county of Pike and State of Ohio, have invented a new and useful Improvement in Corn-Planter, of which the following is a specification:

Figure 1 is a top view of our improved corn-planter. Fig. 2 is a vertical longitudinal section of the same, taken through the line $x\ x$, Fig. 1. Fig. 3 is a detail bottom view of one of the furrowing, dropping, and covering devices.

Similar letters of reference indicate corresponding parts.

The invention will first be described in connection with drawing, and then pointed out in the claim.

A are the wheels, which revolve upon the journals of the axle B. The axle B, near its ends, is attached to the lower side of the rear part of the side bars of the frame C. The front and middle cross-bars of the frame C are made double, one part being attached to the upper, and the other part to the lower, side of the side bars of said frame. D are two long bolts, which pass up through the parts of the middle cross-bar of the frame C, and are secured by nuts, screwed upon them above and below the upper part of said double cross-bar, so that by adjusting the said nuts the opening-plows may be adjusted to work deeper or shallower in the ground, as may be desired. The bolts D are strengthened against the draft-strain by the brace-bars E, through the rear ends of which the said bolts D' pass, and the forward ends of which are attached to the forward cross-bars of the frame C. F is the dropper-frame, the forward parts of the side bars of which are made double, and the forward ends of the parts of which are bolted to metallic straps, which pass around the lower parts of the bolts D, thus hinging the frame F to the frame C. G is a shaft, which revolves in bearings attached to the rear part of the side bars of the frame F; and to its ends are attached the rimless spoke-wheels H, the ends of the spokes of which are made wedge-shaped. The spokes of the wheels H are strengthened near their hubs by braces, as shown in Fig. 2. The shaft G is made of such a length that the wheels H may be a little within the wheels A, as shown in Fig. 1. To the center of the shaft G is attached a cam-wheel, I, upon which rests a cross-bar, J, which is held in place by the rods K, the forward ends of which are rigidly attached to the end parts of the said bar J, and their rear ends are hinged to the rear cross bar of the frame F, so that the bar J may have an up-and-down movement. The bar J is forced down, as it escapes from each cam of the wheel I, by a spring, L, the rear end of which is attached to the rear cross-bar of the frame F, and its forward end rests upon the said bar J, directly above the cam-wheel I. M is a lever, which is pivoted to the frame or standard N of the driver's seat O, and to its rear end is attached a short chain, P, the lower end of which is attached to the front cross-bar of the frame F, so that by operating the said lever the frame F and its attachments may be raised from the ground. The frame F and its attachments may be supported away from the ground by catching the forward end of the lever M upon a catch, $m'$, attached to the middle cross-bar of the frame C. To the side bars of the frame F are attached the seed-hoppers Q, so that their discharge-spouts may pass down through the space between the parts of the side bars of the frame F, and discharge the seed into the cavities of the hollow standards R. The hollow standards R are hinged to the side bars of the frame F, and within the lower parts of their cavities are secured small brushes S, which prevent any more seed passing out at a time than enough to fill the dropping-holes of the slides T. The slides T move up and down along the inner surface of the rear side of the standards R, and are kept in place, and at the same time are kept from rubbing the corn, by plates $r'$, attached to said standards. To the upper ends of the dropping-slides T are pivoted the lower ends of the connecting-bars U, the upper ends of which are pivoted to the bar J, or to short arms rigidly attached to said bar, so that the seed may be dropped by the up-and-down movement of the said bar J as it is operated by the cam-wheel I and the spring L. To the lower end of the connecting-bar U is pivoted the upper end of a connecting-bar, V, the lower end of which is pivoted to a short crank, formed upon one end of a small roller, W, placed in the lower part of the cavity of the standards R, just above the brush S, so as to rock the said roller W, and thus prevent the seed from clogging in the lower part of the standards R. The roller W also supports the seed, and keeps it from bearing too heavily upon the brush S. To the forward side of the lower ends of the standards R are attached the plow-plates X, for opening the furrows to receive the seed. Y are the covering-plates, the inner sides of which are concaved, as shown in Fig. 3, and which are attached to the opposite sides of the lower ends of the standards R. The shanks $y'$ of the coverers Y extend up to, and are secured to and between, the parts of the side bars of the frame F, so as to serve as braces, to support the draft-strain upon the lower part of the standards R. The braces $y'$ may be made separate from the coverers Y, if desired. Z are small rollers, which are made with flanges upon their ends, to press the soil down upon the seed, and are pivoted to arms $z'$, attached to the opposite sides of the lower ends of the standards R. The wheels A are placed at a distance apart equal to the width of two rows, and the standards R are placed at the distance of half the width of one row from the wheels A.

In using the machine, the driver turns the machine and places the wheel next the planted rows in the track made by the said wheel in its previous passage. The driver then adjusts the dropping device so as to bring the points of the rimless wheels H in line with the marks made by said wheel in its previous passage, and drives forward, thus planting the corn in accurate check-row.

Having thus described our invention, we claim as new and desire to secure by Letters Patent—

The combination, with shaft G, of the traction-wheel H, carrying intermediate cam-wheel, the cross-bar J, having pivoted rear arms K, the spring L, resting upon said cross-bar, and the seed-slide rods V, all arranged substantially as and for the purpose specified.

WILSON GARDNER.
GEORGE LEMMON HAYS.

Witnesses:
  DANIEL W. DAILY,
  J. W. CHENOWETH.